(12) United States Patent  
Ou

(10) Patent No.: US 10,943,494 B2  
(45) Date of Patent: Mar. 9, 2021

(54) FLIGHT INSTRUCTING METHOD AND DEVICE, AND AERIAL VEHICLE

(71) Applicant: SZ DJI TECHNOLOGY CO., LTD., Shenzhen (CN)

(72) Inventor: Zelin Ou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 112 days.

(21) Appl. No.: 15/468,430

(22) Filed: Mar. 24, 2017

(65) Prior Publication Data

US 2017/0200377 A1 Jul. 13, 2017

Related U.S. Application Data

(63) Continuation of application No. PCT/CN2014/088029, filed on Sep. 30, 2014.

(51) Int. Cl.
*G08G 5/00* (2006.01)
*H04B 7/185* (2006.01)

(52) U.S. Cl.
CPC ......... *G08G 5/0039* (2013.01); *G08G 5/0013* (2013.01); *G08G 5/0017* (2013.01);
(Continued)

(58) Field of Classification Search
CPC . B64C 39/024; B64C 2201/127; B64C 31/06; B64C 2201/123; G08G 5/003; G08G 5/0047; G08G 5/0021; G08G 1/167; G08G 1/16; G08G 5/0013; G08G 5/0039; G08G 5/0008; G08G 5/0069; G08G 5/0078; G08G 1/0112; G08G 1/048; G08G 5/0043;
(Continued)

(56) References Cited

U.S. PATENT DOCUMENTS 6,085,152 A * 7/2000 Doerfel ................... G01S 17/95
702/3
6,381,538 B1 * 4/2002 Robinson ............... G01C 23/00
701/439
(Continued)

FOREIGN PATENT DOCUMENTS

CN 101533107 A 9/2009
CN 101667036 A 3/2010
(Continued)

OTHER PUBLICATIONS

Wei Zhang, Meteorological Information Receiving and Transmitting Equipment, Aeronautical Meteorological Equipment, pp. 139-143, Jan. 1, 2009, Aviation Industry Press, China.
(Continued)

*Primary Examiner* — Hunter B Lonsberry
*Assistant Examiner* — Luis A Martinez Borrero
(74) *Attorney, Agent, or Firm* — Anova Law Group, PLLC

(57) ABSTRACT

The present disclosure provides a flight instructing method and device as well as an aerial vehicle. The flight instructing method may comprise: obtaining meteorological information of a target flight region; determining a flight-limiting parameter candidate of an aerial vehicle in the target flight region according to the obtained meteorological information; and issuing a flight-limiting indication based on the determined flight-limiting parameter candidate.

14 Claims, 6 Drawing Sheets

(52) U.S. Cl.
CPC ......... *G08G 5/0069* (2013.01); *G08G 5/0091* (2013.01); *H04B 7/18506* (2013.01); *G05D 2201/0209* (2013.01)

(58) Field of Classification Search
CPC .. G08G 1/0969; G05D 1/0088; G05D 1/0061; G05D 2201/0213; H04B 7/18506; H04B 1/16
See application file for complete search history.

(56) References Cited

U.S. PATENT DOCUMENTS

| | | | | |
|---|---|---|---|---|
| 7,720,630 | B1* | 5/2010 | Miller | G08G 5/0091 |
| | | | | 702/150 |
| 8,314,730 | B1* | 11/2012 | Musiak | G01S 13/953 |
| | | | | 342/25 B |
| 9,126,695 | B2* | 9/2015 | Latorre-Costa | G01C 23/00 |
| 9,304,514 | B2* | 4/2016 | Kozlow | G08G 5/0086 |
| 9,567,074 | B2* | 2/2017 | Levien | G08G 5/0082 |
| 9,665,094 | B1 | 5/2017 | Russell | B64D 47/08 |
| 9,688,403 | B2* | 6/2017 | Winn | B64C 39/024 |
| 9,691,288 | B2* | 6/2017 | Agrawal | G08G 5/0091 |
| 9,719,785 | B2* | 8/2017 | Vasek | G01W 1/06 |
| 10,196,142 | B2* | 2/2019 | Winn | G05D 1/0094 |
| 10,429,839 | B2 | 10/2019 | Liu | G05D 1/0088 |
| 2005/0004723 | A1* | 1/2005 | Duggan | B64C 19/00 |
| | | | | 701/24 |
| 2007/0061116 | A1* | 3/2007 | Bush | G01C 23/00 |
| | | | | 703/8 |
| 2008/0059052 | A1 | 3/2008 | Bui et al. | |
| 2008/0243317 | A1* | 10/2008 | Morales De La Rica | |
| | | | | G05D 1/106 |
| | | | | 701/11 |
| 2009/0012663 | A1* | 1/2009 | Mead | G01W 1/10 |
| | | | | 701/14 |
| 2011/0001662 | A1* | 1/2011 | Fouet | G01S 7/003 |
| | | | | 342/26 B |
| 2012/0143487 | A1* | 6/2012 | Giovannini | G08G 5/0078 |
| | | | | 701/301 |
| 2012/0218127 | A1* | 8/2012 | Kroen | G08G 5/006 |
| | | | | 340/945 |
| 2013/0006512 | A1 | 1/2013 | Saggio, III et al. | |
| 2013/0060405 | A1* | 3/2013 | Komatsuzaki | G08G 5/006 |
| | | | | 701/3 |
| 2014/0172193 | A1* | 6/2014 | Levien | B64C 39/024 |
| | | | | 701/2 |
| 2015/0192926 | A1* | 7/2015 | Kozlow | G05D 1/0202 |
| | | | | 701/3 |
| 2015/0323930 | A1* | 11/2015 | Downey | G08G 5/006 |
| | | | | 701/2 |
| 2015/0336668 | A1* | 11/2015 | Pasko | B64C 39/024 |
| | | | | 701/2 |
| 2015/0336671 | A1* | 11/2015 | Winn | G05D 1/0094 |
| | | | | 701/3 |
| 2016/0011741 | A1* | 1/2016 | Khatwa | G08G 5/0052 |
| | | | | 715/765 |
| 2016/0070265 | A1* | 3/2016 | Liu | G01C 21/00 |
| | | | | 701/3 |
| 2016/0091894 | A1* | 3/2016 | Zhang | G09B 19/165 |
| | | | | 701/2 |
| 2016/0117931 | A1* | 4/2016 | Chan | G08G 5/0034 |
| | | | | 701/120 |
| 2016/0196525 | A1* | 7/2016 | Kantor | G08G 5/0013 |
| | | | | 705/330 |
| 2016/0307447 | A1* | 10/2016 | Johnson | B60L 58/12 |
| 2017/0069214 | A1* | 3/2017 | Dupray | G08G 5/0013 |
| 2017/0075033 | A1* | 3/2017 | Cerqueira | G01W 1/10 |
| 2017/0259917 | A1* | 9/2017 | Winn | G05D 1/0202 |
| 2018/0005536 | A1* | 1/2018 | Jacquier | G08G 5/0021 |
| 2018/0020081 | A1* | 1/2018 | Teague | H04W 24/00 |
| 2019/0118946 | A1* | 4/2019 | Winn | G05D 1/0094 |

FOREIGN PATENT DOCUMENTS

| | | |
|---|---|---|
| CN | 201707324 U | 1/2011 |
| CN | 102854884 A | 1/2013 |
| CN | 102881187 A | 1/2013 |
| CN | 103991552 A | 8/2014 |
| JP | H04298000 A | 10/1992 |
| JP | 2001267829 A | 9/2001 |
| JP | 2002293299 A | 10/2002 |
| JP | 2014104797 A | 6/2014 |
| WO | 2011155020 A1 | 12/2011 |

OTHER PUBLICATIONS

The World Intellectual Property Organization (WIPO) International Search Report for PCT/CN2014/088029 dated May 28, 2015 6 Pages.

* cited by examiner

FLIGHT INSTRUCTING METHOD AND DEVICE, AND AERIAL VEHICLE

CROSS-REFERENCE TO RELATED APPLICATION

This is a continuation application of International Application No. PCT/CN2014/088029, filed on Sep. 30, 2014, the entire contents of which are incorporated herein by reference.

TECHNICAL FIELD

The present invention relates to the field of flight technology and, particularly, to a flight instructing method and device, and an aerial vehicle thereof.

BACKGROUND OF THE INVENTION

An aerial vehicle, such as an unmanned aerial vehicle (UAV), has already been used to some particular scenarios. The aerial vehicle may perform a variety of tasks, such as high-altitude photography, unmanned detection and reconnaissance, surveying and mapping, highway exploration, city planning, ecological environmental monitoring, scientific investigation, oil exploration, aerial remote sensing, boarder patrolling, forest-fire prevention, disaster evaluation and the like, in an automatic mode or a user manual mode.

During the flight control process for a flight of the aerial vehicle, most users do not know clearly what impact certain climatic conditions may bring to the flight, which may cause damage to the aerial vehicle.

SUMMARY OF THE INVENTION

Various technical problems to be solved by embodiments of the present invention include to provide a flight instructing method and device which are capable of automatically and intelligently determining flight parameters in certain regions that are impacted by meteorological conditions.

In one aspect, an embodiment of the present invention provides a flight instructing method comprising:

obtaining meteorological information of a target flight region;

determining a flight-limiting parameter candidate of an aerial vehicle in the target flight region according to the obtained meteorological information;

issuing a flight-limiting indication based on the determined flight-limiting parameter candidate.

In some embodiments, optionally, obtaining meteorological information of a target flight region may comprise:

using a region where an aerial vehicle currently flies in or a region designated by the user as the target flight region;

according to meteorological reference information of the aerial vehicle, accessing a network and searching the meteorological information of the target flight region indicated by the meteorological reference information;

wherein the meteorological reference information comprises: designated meteorological reference information or meteorological reference information generated based on a type of the aerial vehicle.

In some embodiments, optionally, determining a flight-limiting parameter candidate of an aerial vehicle in the target flight region according to the obtained meteorological information may comprise:

looking up a flight parameter associated with the obtained meteorological information according to a preset mapping relationship between the meteorological information and the flight parameters;

determining the looked up flight parameter as the flight-limiting parameter candidate of the aerial vehicle in the target flight region.

In some embodiments, optionally, a mapping relationship between the meteorological information and a level thereof and the flight parameters is included in the preset mapping relationship between the meteorological information and the flight parameters;

looking up a flight parameter associated with the obtained meteorological information according to the preset mapping relationship between the meteorological information and the flight parameters comprises:

analyzing and determining a meteorological level of the obtained meteorological information;

looking up an associated flight parameter in the preset mapping relationship between the meteorological information and the flight parameters based on the meteorological information and the level thereof.

In some embodiments, optionally, determining a flight-limiting parameter candidate of an aerial vehicle in the target flight region according to the obtained meteorological information comprises:

running a preset simulator according to the obtained various meteorological information as simulative meteorological input parameters, to determine an impact of a simulative meteorological environment generated by various meteorological information on a flight of a simulated aerial vehicle, and to further determine the flight-limiting parameter candidate of the aerial vehicle in the target flight region.

In some embodiments, optionally, the method may further comprise:

judging whether a flight path in the target flight region is included in a flight task of the aerial vehicle;

if yes, modifying and updating the determined flight-limiting parameter candidate according to the meteorological information to cause the aerial vehicle to fly normally.

In some embodiments, optionally, issuing a flight-limiting indication based on the determined flight-limiting parameter candidate may comprise: displaying the determined flight-limiting parameter candidate to a user; or generating a flight-limiting instruction for controlling a limited flight of the aerial vehicle according to the determined flight-limiting parameter, and issuing the flight-limiting instruction to control the limited flight of the aerial vehicle.

In some embodiments, optionally, issuing a flight-limiting indication based on the determined flight-limiting parameter candidate may comprise:

providing the flight-limiting parameter candidate to a user to select;

generating a flight-limiting instruction for controlling a limited flight of the aerial vehicle according to a selection operation for the provided flight-limiting parameter candidate;

issuing the flight-limiting instruction to control the limited flight of the aerial vehicle.

In some embodiments, optionally, the determined flight-limiting parameter candidate may comprise any one or more of a flight speed parameter candidate, a flight altitude parameter candidate, and a flight distance range parameter candidate.

In another aspect, embodiments of the present invention also provide a flight instructing device comprising:

an obtaining module configured for obtaining meteorological information of a target flight region;

a determining module configured for determining a flight-limiting parameter candidate of an aerial vehicle in the target flight region according to the obtained meteorological information; and a prompting module configured for issuing a flight-limiting indication based on the determined flight-limiting parameter candidate.

In some embodiments, optionally, the obtaining module may comprise:

a region determining unit configured for using a region where the aerial vehicle lies on currently or a region designated by a user as the target flight region;

a network unit configured for, according to meteorological reference information of the aerial vehicle, accessing a network and searching the meteorological information of the target flight region indicated by the meteorological reference information; wherein the meteorological reference information comprises: designated meteorological reference information or meteorological reference information generated based on a type of the aerial vehicle.

In some embodiments, optionally, the determining module may comprise:

a looking up unit configured for looking up a flight parameter associated with the obtained meteorological information according to a preset mapping relationship between the meteorological information and the flight parameters;

a candidate determining unit configured for determining the looked up flight parameter as the flight-limiting parameter candidate of the aerial vehicle in the target flight region.

In some embodiments, optionally, a mapping relationship between the meteorological information and a level thereof and the flight parameters is included in the preset mapping relationship between the meteorological information and the flight parameters;

the looking up unit is specifically configured for analyzing and determining a meteorological level of the obtained meteorological information; looking up an associated flight parameter in the preset mapping relationship between the meteorological information and the flight parameters based on the meteorological information and the level thereof.

In some embodiments, optionally, the determining module is specifically configured for running a preset simulator according to the obtained various meteorological information as simulative meteorological input parameters, to determine an impact of a simulative meteorological environment generated by various meteorological information on a flight of a simulated aerial vehicle, and to further determine the flight-limiting parameter candidate of the aerial vehicle in the target flight region.

In some embodiments, optionally, the device may further comprise:

a flight processing module configured for judging whether a flight path in the target flight region is included in a flight task of the aerial vehicle and, if yes, modifying and updating the determined flight-limiting parameter candidate according to the meteorological information to cause the aerial vehicle to fly normally.

In some embodiments, optionally, the prompting module is specifically configured for displaying the determined flight-limiting parameter candidate; or generating a flight-limiting instruction for controlling a limited flight of the aerial vehicle according to the determined flight-limiting parameter, and issuing the flight-limiting instruction to control the limited flight of the aerial vehicle.

In some embodiments, optionally, the prompting module is specifically configured for providing the flight-limiting parameter candidate to a user to select; generating a flight-limiting instruction for controlling a limited flight of the aerial vehicle according to a selection operation for the provided flight-limiting parameter candidate; issuing the flight-limiting instruction to control the limited flight of the aerial vehicle.

Correspondingly, an embodiment of the present invention further provides an aerial vehicle comprising: a communication device and a processor, wherein the processor is configured for obtaining meteorological information of a target flight region through the communication device; determining a flight-limiting parameter candidate of the aerial vehicle in the target flight region according to the obtained meteorological information; issuing a flight-limiting indication based on the determined flight-limiting parameter candidate.

The embodiments of the present invention may determine the flight-limiting parameter based on the obtained meteorological information of the target flight region, create the flight-limiting indication, and prompt the user in advance or control an unmanned aerial vehicle directly to perform a flight task more safely in the target flight region, ensuring flight safety of the aerial vehicle and meeting requirements of the user of the aerial vehicle on automatic and intelligent meteorological information.

DETAILED DESCRIPTION OF THE INVENTION

The technical solutions of the present invention will be described below in combination with the drawings in various embodiments of the present invention. It should be apparent that the embodiments described herein are only a part rather than all of the embodiments of the present invention. Other embodiments obtained by those having ordinary skill in the art on the basis of the embodiments of the present invention without any inventive efforts should fall within the protection scope of the present invention.

An embodiment of the present invention can automatically obtain meteorological information of a certain target region, and then determine one or more flight parameter candidates of an aerial vehicle which might be limited by meteorological conditions according to the meteorological information, so that a user or the aerial vehicle can select whether to cancel or to modify a flight task according to the requirement of the flight task. The target region may be a region for the aerial vehicle to pass by when flying automatically as the aerial vehicle performs the flight task, or a region specified by the user according to certain requirements.

Figure 1:
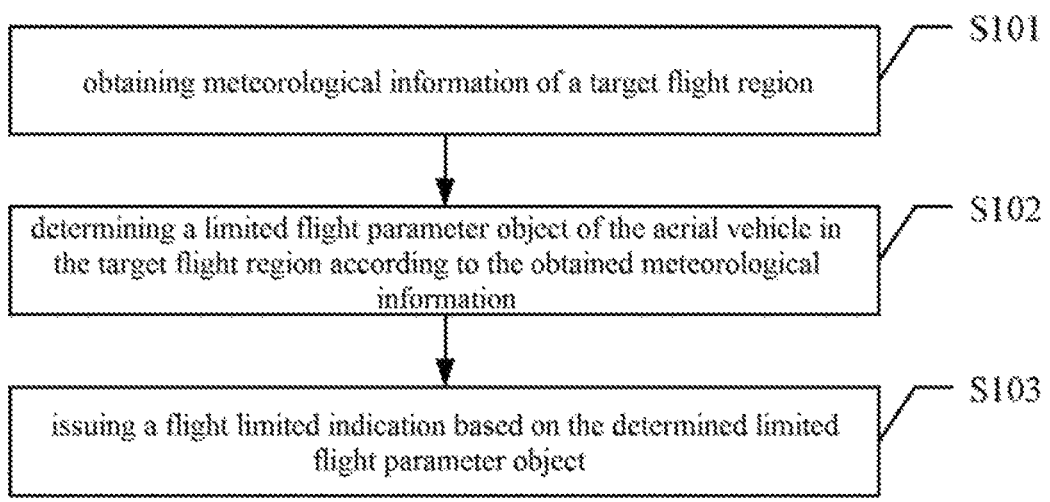
FIG. 1 illustrates a flow chart of a flight instructing method according to an embodiment of the present invention.

Referring to FIG. 1, which is a flow chart of a flight instructing method according to embodiments of the present invention, the method according to the embodiments of the present invention may be implemented by an intelligent mobile terminal with a network function for controlling the aerial vehicle, such as a smart phone, a tablet, an intelligent wearable apparatus or the like. Of course, the method may also be implemented by a flight controller with a network communication function disposed on the aerial vehicle. The embodiments of the present invention use an implementation in the intelligent mobile terminal as an example to illustrate the method. Specifically, the method may include the following steps.

S101: obtaining meteorological information of a target flight region.

In one embodiment, the meteorological information of the target flight region may be queried by accessing a server which provides the meteorological information via the Internet or the like. The meteorological information needs to be queried may be all meteorological information provided by the server, and may also be the required meteorological information which is queried or screened out from all meteorological information based on related flight parameters, which may be determined by the intelligent mobile terminal based on the model number and performance of the aerial vehicle.

Alternatively, the intelligent mobile terminal or the aerial vehicle may come with its own meteorological monitoring function, for example, with simple mechanisms for monitoring meteorological information, such as wind speed, wind direction, air temperature, air pressure and the like, so as to implement monitoring of the meteorological information based on these monitoring mechanisms when the aerial vehicle needs to fly in a certain region.

S102: determining a flight-limiting parameter candidate of the aerial vehicle in the target flight region according to the obtained meteorological information.

The mobile terminal may use a preset simulator to evaluate an impact on a flight of a simulated aerial vehicle by a simulative meteorological environment generated by the meteorological information, and thereby calculates and determines one or more flight parameters of the aerial vehicle that might need to be limited (flight-limiting parameter candidate(s)). In the simulator of the mobile terminal, specifically, the meteorological environment may be simulated based on a level of the wind speed, a temperature level of the air temperature and a value of the air pressure, and the simulated meteorological environment may be applied on the simulated aerial vehicle in the simulator, so as to more precisely evaluate the flight-limiting parameter candidate(s).

Of course, in a simple implementation, a mapping table may be provided to include a mapping relationship between the meteorological information and the flight parameters. A one-to-one mapping relationship between the meteorological information (and a level thereof) and the flight parameters may be specifically included in the mapping table. After the meteorological information of the target flight region is obtained, the mapping table is looked up based on the specific data of the meteorological information (for example, wind speed level), and a possible flight-limiting parameter candidate can be obtained. Using the looking up table is relatively quick and convenient to realize.

S103: issuing a flight-limiting indication based on the determined flight-limiting parameter candidate(s).

In some embodiments, S103 may specifically comprise: displaying the determined flight-limiting parameter candidate(s); or issuing a flight-limiting control instruction according to the determined flight-limiting parameters.

In some embodiments, the flight-limiting indication may just be prompting information in a preset format for prompting a user, and the mobile terminal may display the flight-limiting parameter candidate(s) in a list on a display screen as the flight-limiting indication. Suggestion information by the user may be added into the flight-limiting indication. For example, after a visibility information is determined based on a haze level, the suggestion information of a flight altitude limit and/or distance limit is issued. Specifically, if the visibility is 100 m, the flight-limiting indication comprising a flight altitude being limited to 100 m is issued.

It should be noted that, if it is implemented by a flight controller of the aerial vehicle, in S103, the flight controller may send related information to a designated user terminal such that the flight-limiting parameters can be prompted to the user.

The flight-limiting indication information may include a flight control instruction issued based on the flight-limiting parameters and corresponding meteorological information. As described above, after the visibility information is determined based on the haze level, flight control instructions to limit altitude and to limit distance may be generated as the flight-limiting indication, so as to limit the flight altitude and flight distance and the like when the aerial vehicle flies in the target flight region to ensure flight safety.

Further, an alert level may also be displayed correspondingly. For some very dangerous meteorological conditions, for example, a strong wind environment, a red alert and the like is issued. Moreover, in some embodiments, for a good meteorological condition, that is, when no flight-limiting indication is determined, the prompting information of being suitable to fly may be issued.

In addition, the obtained meteorological information may be displayed at a designated position on the display screen, and may further be displayed in the form of a drawing icon, facilitating the user to view intuitively the meteorological condition of the target region.

Accordingly, the embodiments of the present invention may determine the flight-limiting parameters based on the obtained meteorological information of the target flight region, create the flight-limiting indication, and prompt the user in advance or control an unmanned aerial vehicle directly to perform a flight task more safely in the target flight region, ensuring flight safety of the aerial vehicle and meeting requirements of the user of the aerial vehicle on automatic and intelligent meteorological information.

Figure 2:
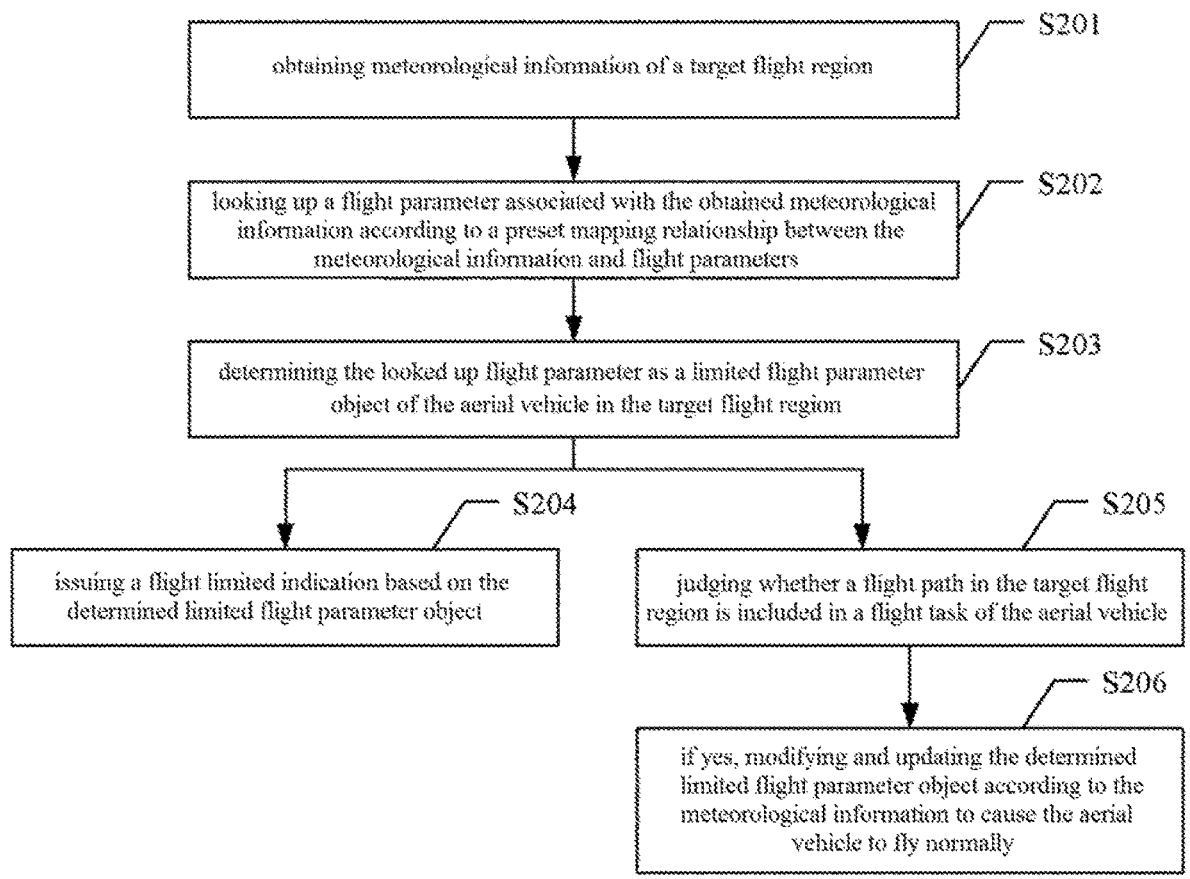
FIG. 2 illustrates a flow chart of another flight instructing method according to an embodiment of the present invention.

Referring to FIG. 2, which is a flow chart of another flight instructing method according to embodiments of the present invention, the method according to the embodiments of the present invention may be implemented by an intelligent mobile terminal with a network function for controlling the aerial vehicle, such as a smart phone, a tablet, an intelligent wearable apparatus or the like. Of course, the method may also be implemented by a flight controller with a network communication function disposed on the aerial vehicle. Specifically, the method may include the following steps.

S201: obtaining meteorological information of a target flight region.

Specifically, S201 may comprise: using a region where an aerial vehicle currently flies in or a region designated by the user as the target flight region; based on meteorological reference information of the aerial vehicle, accessing a network and searching the meteorological information of the target flight region indicated by the meteorological reference information. The meteorological reference information may include: designated meteorological reference information or meteorological reference information generated based on a type of the aerial vehicle. The meteorological reference information is used for indicating which meteorological information needs to be searched, for example, a wind speed indication, a wind direction indication and the like. In this way, the amount of data to be searched may be smaller.

S202: looking up a flight parameter or parameters associated with the obtained meteorological information according to a preset mapping relationship between the meteorological information and flight parameters.

S203: determining the looked up flight parameter(s) as a flight-limiting parameter candidate(s) of the aerial vehicle in the target flight region.

In some embodiments, specifically, in the preset mapping relationship between the meteorological information and the flight parameters, the mapping relationship between the meteorological information (and a level thereof) and the flight parameters is included. Looking up a flight parameter associated with the obtained meteorological information according to the preset mapping relationship between the meteorological information and flight parameters may comprise: analyzing and determining a meteorological level of the obtained meteorological information; looking up the associated flight parameter in the preset mapping relationship between the meteorological information and the flight parameters based on the meteorological information and the level thereof. For example, a lower level of haze will not be associated with a flight distance range parameter and a flight altitude parameter, and the flight distance range parameter and the flight altitude parameter will not be determined as flight-limiting parameters under the meteorological condition with a lower level of haze.

The determined flight-limiting parameter candidate may comprise any one of or a combination of a flight speed parameter candidate, a flight altitude parameter candidate, and a flight distance range candidate.

S204: issuing a flight-limiting indication based on the determined flight-limiting parameter candidate.

In some embodiments, the flight-limiting indication is directly displayed to the user of the aerial vehicle as prompting information.

S205: judging whether a flight path in the target flight region is included in a flight task of the aerial vehicle.

S206: if a flight path in the target flight region is included in a flight task of the aerial vehicle, modifying and updating the determined flight-limiting parameter candidate according to the meteorological information to cause the aerial vehicle to fly normally.

In some embodiments, after the flight-limiting parameter candidate is determined in S203, if the aerial vehicle is performing an automatic flight task, it is judged whether a flight path in the target flight region is included in the flight task of the aerial vehicle. If the flight path in the target flight region is included in the flight task of the aerial vehicle, the flight path may be modified to avoid the target flight region, or a flight limit, such as a limit about flight altitude and the like, may be added when the aerial vehicle is in the flight region.

In some embodiments, the flight-limiting parameters of a plurality of different regions may be obtained simultaneously in S201 to S203, and each region is judged in S205 and S206 to determine whether the flight task to be performed by the aerial vehicle will be modified or not.

Accordingly, the embodiments of the present invention may determine the flight-limiting parameters rapidly based on the obtained meteorological information of the target flight region and the mapping table, create the flight-limiting indication, and prompt the user in advance and modify the flight task of the aerial vehicle, such that the unmanned aerial vehicle can perform the flight task in various regions more safely, ensuring flight safety of the aerial vehicle and meeting requirements of the user of the aerial vehicle on automatic and intelligent meteorological information.

Figure 3:
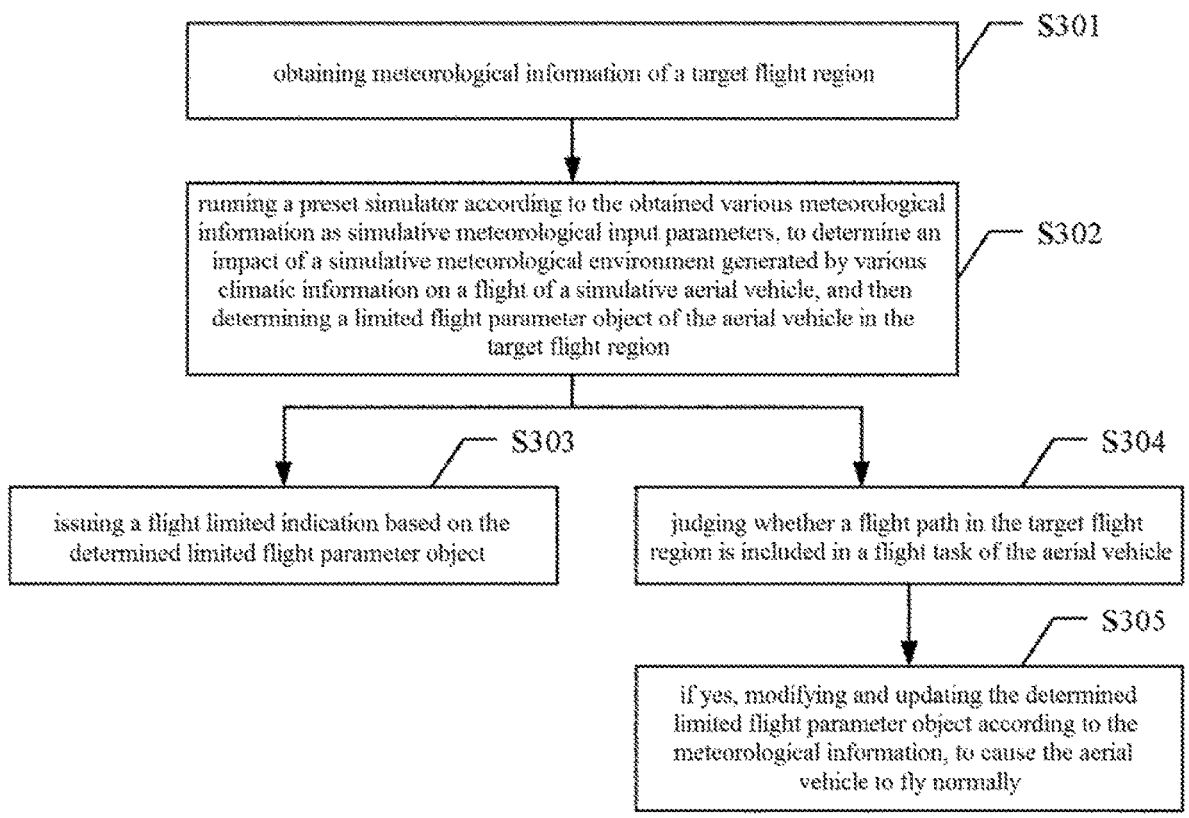
FIG. 3 illustrates a flow chart of another flight instructing method according to an embodiment of the present invention.

Referring to FIG. 3, which is a flow chart of yet another flight instructing method according to embodiments of the present invention, the method according to the embodiments of the present invention may be implemented by an intelligent mobile terminal with a network function for controlling the aerial vehicle, such as a smart phone, a tablet, an intelligent wearable apparatus or the like. The method may also be implemented by a flight controller with a network communication function disposed on the aerial vehicle. Specifically, the method may include the following steps.

S301: obtaining meteorological information of a target flight region.

Specifically, S301 may comprise: using a region where an aerial vehicle currently flies in or a region designated by the user as the target flight region; based on meteorological reference information of the aerial vehicle, accessing a network and searching the meteorological information of the target flight region indicated by the meteorological reference information. The meteorological reference information may include: designated meteorological reference information or meteorological reference information generated based on a type of the aerial vehicle.

S302: running a preset simulator according to the obtained various meteorological information as simulative meteorological input parameters, to determine an impact of a simulative meteorological environment generated by the various meteorological information on a flight of a simulated aerial vehicle, and to further determine a flight-limiting parameter candidate(s) of the aerial vehicle in the target flight region.

In some embodiments, the determined flight-limiting parameter candidate may specifically comprise any one or a combination of a flight speed parameter candidate, a flight altitude parameter candidate, and a flight distance range parameter candidate.

S303: issuing a flight-limiting indication based on the determined flight-limiting parameter candidate(s).

In some embodiments, the flight-limiting indication may be displayed directly to the user of the aerial vehicle as prompting information.

S304: judging whether a flight path in the target flight region is included in a flight task of the aerial vehicle.

S305: if the flight path in the target flight region is included in a flight task of the aerial vehicle, modifying and updating the determined flight-limiting parameter candidate according to the meteorological information, to cause the aerial vehicle to fly normally.

In some embodiments, after the flight-limiting parameter candidate is determined in S302, if the aerial vehicle is performing an automatic flight task, it is judged whether a flight path in the target flight region is included in the flight task of the aerial vehicle. If the flight path in the target flight region is included in a flight task of the aerial vehicle, the flight path may be modified to avoid the target flight region, or a flight limit, such as a limit about flight altitude and the like, may be added when the aerial vehicle is in the flight region.

In some embodiments, the flight-limiting parameters of a plurality of different regions may be obtained simultaneously in S301 to S302, and each region is judged in S304 and S305, to determine whether the flight task to be performed by the aerial vehicle will be modified or not.

Accordingly, the embodiments of the present invention may determine the flight-limiting parameters more comprehensively based on the obtained meteorological information of the target flight region and the simulator, create the flight-limiting indication, and prompt the user in advance and modify the flight task of the aerial vehicle, such that the unmanned aerial vehicle can perform the flight task in various regions more safely, ensuring flight safety of the aerial vehicle and meeting requirements of the user of the aerial vehicle on automatic and intelligent meteorological information.

Figure 4:
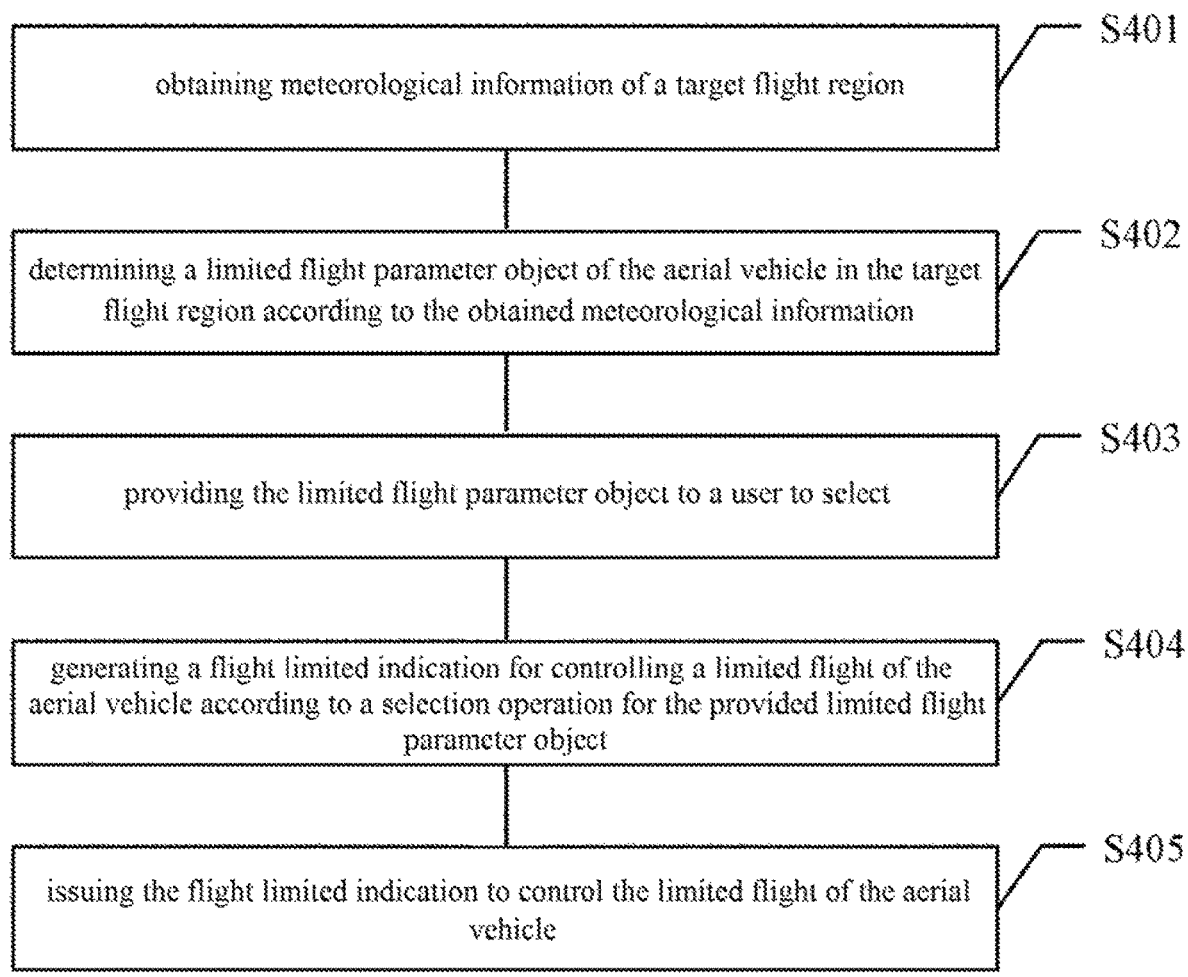
FIG. 4 illustrates a flow chart of another flight instructing method according to an embodiment of the present invention.

Referring to FIG. 4, which is a flow chart of still yet another flight instructing method according to embodiments of the present invention, the method according to the embodiments of the present invention may be implemented by an intelligent mobile terminal with a network function for controlling the aerial vehicle, such as a smart phone, a tablet, an intelligent wearable apparatus or the like. The method may also be implemented by a flight controller with a network communication function disposed on the aerial vehicle. Specifically, the method may include the following steps.

S401: obtaining meteorological information of a target flight region.

Specifically, S401 may comprise: using a region where an aerial vehicle currently flies in or a region designated by the user as the target flight region; based on meteorological reference information of the aerial vehicle, accessing a network and searching the meteorological information of the target flight region indicated by the meteorological reference information. The meteorological reference information may include: designated meteorological reference information or meteorological reference information generated based on a type of the aerial vehicle.

S402: determining a flight-limiting parameter candidate of the aerial vehicle in the target flight region according to the obtained meteorological information.

In some embodiments, S402 may specifically comprise: looking up the flight parameter associated with the obtained meteorological information according to a preset mapping relationship between the meteorological information and the flight parameters. The looked up flight parameter is determined as the flight-limiting parameter candidate of the aerial vehicle in the target flight region. Alternatively, S402 may specifically comprise: running a preset simulator according to the obtained various meteorological information as simulative meteorological input parameters, to determine an impact of a simulative meteorological environment generated by various meteorological information on a flight of a simulated aerial vehicle, and to further determine the flight-limiting parameter candidate of the aerial vehicle in the target flight region.

In some embodiments, specifically, in the preset mapping relationship between the meteorological information and the flight parameters, the mapping relationship between the meteorological information (and a level thereof) and the flight parameters is included. Looking up a flight parameter associated with the obtained meteorological information according to the preset mapping relationship between the meteorological information and flight parameters may comprise: analyzing and determining a meteorological level of the obtained meteorological information; looking up the associated flight parameter in the preset mapping relationship between the meteorological information and the flight parameters based on the meteorological information and the level thereof. The determined flight-limiting parameter candidate may comprise any one of or a combination of a flight speed parameter candidate, a flight altitude parameter candidate, and a flight distance range parameter candidate.

S403: providing the flight-limiting parameter candidate(s) to a user for selection.

Specifically, each of the determined flight-limiting parameter candidates may be displayed to the user in a form of a button to facilitate the user to click the button to select any flight-limiting parameter candidate.

S404: generating a flight-limiting instruction for controlling a limited flight of the aerial vehicle according to a selection operation on the provided flight-limiting parameter candidates.

The user may select one or more parameters which are allowed to be limited, or one or more parameters which are not allowed to be limited, by a way of clicking by a touch screen or by a mouse or the like as required.

S405: issuing the flight-limiting instruction to control the limited flight of the aerial vehicle.

The flight limit may be performed selectively according to an actual selection of the user. For example, a limit to the flight distance may be determined in a haze weather, but since the user is in a sparsely populated and spacious region, at this time the user may select not to be limited by the flight distance. Thus, the issued flight-limiting instruction does not include a control information for controlling the aerial vehicle to fly within a limited distance (a distance from the aerial vehicle to the user).

Accordingly, the embodiments of the present invention may determine the flight-limiting parameters more comprehensively based on the obtained meteorological information of the target flight region and the simulator, create the flight-limiting indication, and prompt the user in advance and modify the flight task of the aerial vehicle, such that the unmanned aerial vehicle can perform the flight task in various regions more safely, ensuring flight safety of the aerial vehicle and meeting requirements of the user of the aerial vehicle on automatic and intelligent meteorological information.

A flight instructing device and an aerial vehicle according to an embodiment of the present invention will be described in details below.

Figure 5:
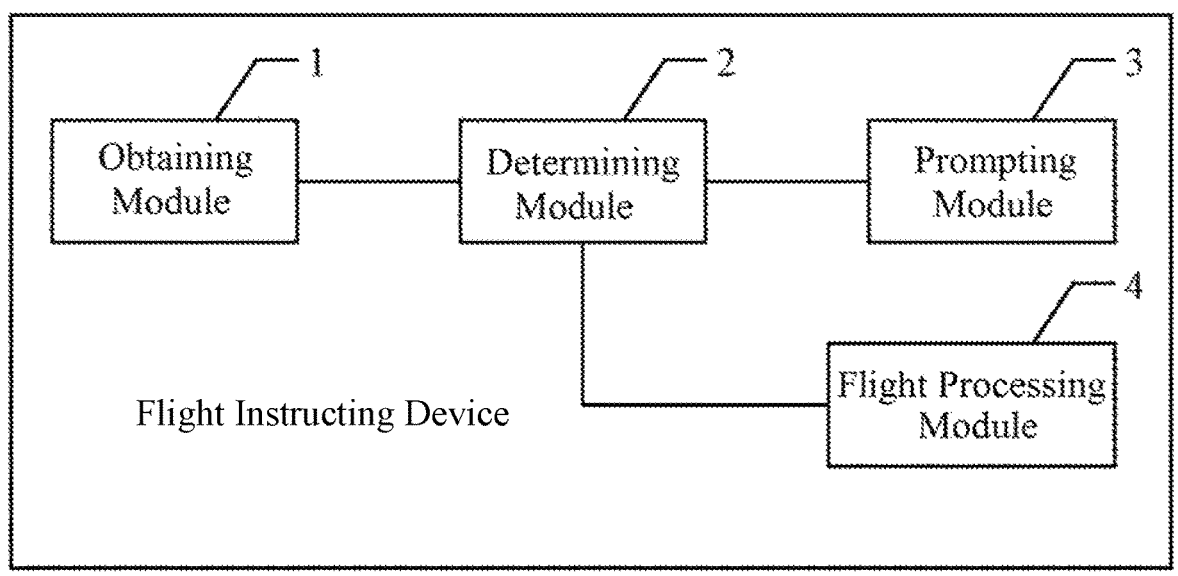
FIG. 5 illustrates a schematic view of a flight instructing device according to an embodiment of the present invention.

Referring to FIG. 5, which is a schematic view of a flight instructing device according to embodiments of the present invention, the flight instructing device according to the embodiments of the present invention may be provided in an intelligent mobile terminal, such as a smart phone, a tablet, an intelligent wearable device and the like, or provided directly in a flight controller of the aerial vehicle. Specifically, the device may comprise the following components.

An obtaining module 1 configured for obtaining meteorological information of a target flight region; a determining module 2 configured for determining a flight-limiting parameter candidate of the aerial vehicle in the target flight region according to the obtained meteorological information; and a prompting module 3 configured for issuing a flight-limiting indication based on the determined flight-limiting parameter candidate.

The obtaining module 1 may access into a server which provides the meteorological information via the Internet and the like and queries meteorological information of the target flight region. The meteorological information needed to be queried may be all meteorological information provided by the server, or the required meteorological information which is queried or screened out from all meteorological information based on the related flight parameters which may be determined by the intelligent mobile terminal based on the model number and performance of the aerial vehicle.

The flight-limiting indication information may also be a flight control instruction issued based on the flight-limiting parameter and corresponding meteorological information. As described above, after the visibility information is determined based on the haze level, flight control instructions to limit altitude and to limit distance may be generated as the flight-limiting indication, so as to limit the flight altitude and flight distance and the like when the aerial vehicle flies in the target flight region to ensure flight safety.

Further, an alert level may be also displayed correspondingly. For some very dangerous meteorological conditions, for example, a strong wind environment, a red alert and the like is issued. Moreover, in some embodiments, for a good meteorological condition, that is, when no flight-limiting indication is determined, the prompting information of being suitable to fly may be issued.

The obtaining module 1 may specifically comprise certain units below (not shown).

A region determining unit configured for using a region where an aerial vehicle currently flies in or a region designated by the user as the target flight region.

A network unit configured for, based on meteorological reference information of the aerial vehicle, accessing a network and searching the meteorological information of the target flight region indicated by the meteorological reference information. The meteorological reference information may comprise designated meteorological reference information or meteorological reference information generated based on a type of the aerial vehicle.

Alternatively, the obtaining module 1 may be configured for realizing a monitoring for the meteorological information based on a meteorological monitoring function of the mobile terminal or the aerial vehicle, for example, simple mechanisms for monitoring meteorological information, such as wind speed, wind direction, air temperature, air pressure and the like.

The determining module 2 may specifically be configured for determining a flight-limiting parameter candidate by looking up a mapping table or a simulator. Optionally, the determining module 2 may specifically comprise certain units below (not shown).

A looking up unit configured for looking up a flight parameter associated with the obtained meteorological information according to a preset mapping relationship between the meteorological information and the flight parameters.

A candidate determining unit configured for determining the looked up flight parameter as the flight-limiting parameter candidate of the aerial vehicle in the target flight region.

In some embodiments, in the preset mapping relationship between the meteorological information and the flight parameters, a mapping relationship between the meteorological information (and a level thereof) and the flight parameters is included.

The looking up unit is specifically configured for analyzing and determining a meteorological level of the obtained meteorological information; looking up the associated flight parameter in the preset mapping relationship between the meteorological information and the flight parameters based on the meteorological information and the level thereof.

Further optionally, the determining module 2 is specifically configured for running a preset simulator according to the obtained various meteorological information as simulative meteorological input parameters, to determine an impact of a simulative meteorological environment generated by the various meteorological information on a flight of a simulated aerial vehicle, and to further determine a flight-limiting parameter candidate(s) of the aerial vehicle in the target flight region.

Further optionally, after the flight-limiting parameter candidate(s) is determined, the device according to the embodiments of the present invention can update and modify the flight task automatically. The device according to the embodiments of the present invention may specifically comprise a flight processing module 4 configured for judging whether a flight path in the target flight region is included in the flight task of the aerial vehicle and, if yes, modifying and updating the determined flight-limiting parameter candidate according to the meteorological information to cause the aerial vehicle to fly normally.

Further, optionally, the prompting module 4 may be specifically configured for displaying the determined flight-limiting parameter candidate when the flight-limiting indication is issued; or generating a flight-limiting instruction for controlling a limited flight of the aerial vehicle according to the determined flight-limiting parameter, and issuing the flight-limiting instruction to control the limited flight of the aerial vehicle.

Further, optionally, the prompting module 3 is specifically configured for, when the flight-limiting indication is issued, providing the flight-limiting parameter candidates to a user to select; generating a flight-limiting instruction for controlling the limited flight of the aerial vehicle according to a selection operation for the provided flight-limiting parameter candidate; issuing the flight-limiting instruction to control the limited flight of the aerial vehicle.

It should be noted that, the specific implementations of various modules and units in the device according to the embodiments of the present invention may refer to the description of the embodiments of the above-described method correspondingly.

Accordingly, the embodiments of the present invention may determine the flight-limiting parameter based on the obtained meteorological information of the target flight region, create the flight-limiting indication, and prompt the user in advance and modify the flight task of the aerial vehicle, such that the unmanned aerial vehicle can perform the flight task in various regions more safely, ensuring flight safety of the aerial vehicle and meeting requirements of the user of the aerial vehicle on automatic and intelligent meteorological information.

Figure 6:
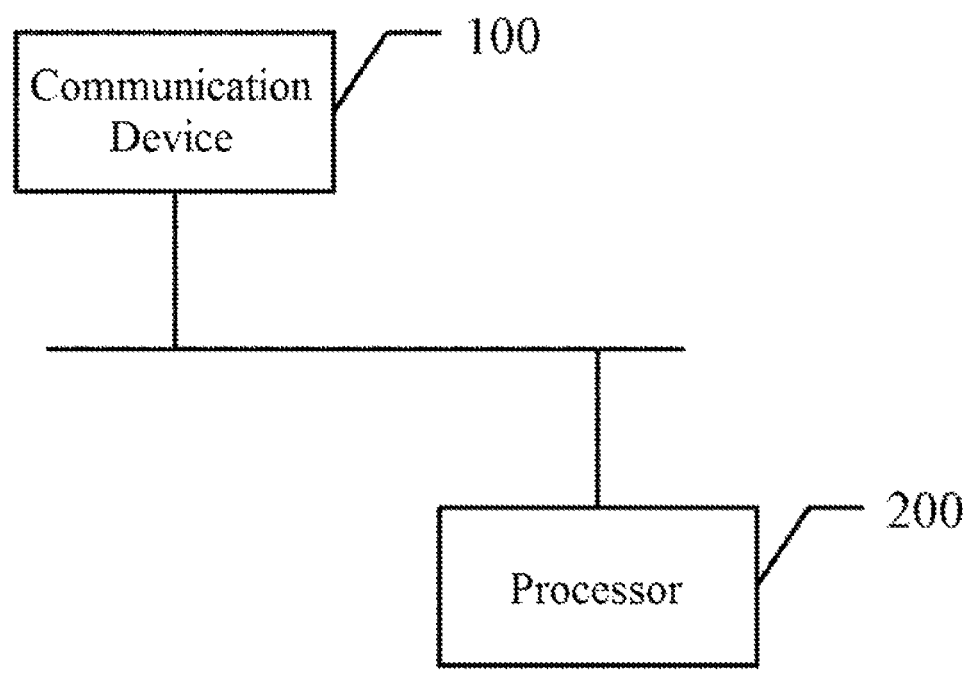
FIG. 6 illustrates a schematic view of an aerial vehicle according to an embodiment of the present invention.

Referring to FIG. 6, which is a schematic view of an aerial vehicle according to embodiments of the present invention, the aerial vehicle according to the embodiments of the present invention may comprise an existing related structure for flying. Specifically, the aerial vehicle may comprise an aerial vehicle body, a power supply, a propulsion component, and some attached shooting device, gimbal device and the like, further comprise a memory for storing a flight instructing application. In some embodiments, the aerial vehicle comprises a communication device 100 and a processor 200, wherein the processor 200 is configured for invoking a related application in the memory, obtaining meteorological information of a target flight region by the communication device 100; determining a flight-limiting parameter candidate of the aerial vehicle in the target flight region according to the obtained meteorological information; and issuing a flight-limiting indication based on the determined flight-limiting parameter candidate.

The processor 200 may be connected to a network through the communication device 100 to search the meteorological information of the target flight region, and sending the flight-limiting parameter candidate through the communication device 100 to a designated user terminal as a flight-limiting indication.

Further, specifically, the processor 200 may invoke an application in the memory, and may be further configured for judging whether a flight path in the target flight region is included in a flight task of the aerial vehicle and, if yes, modifying and updating the determined flight-limiting parameter candidate according to the meteorological information to cause the aerial vehicle to fly normally.

Further, optionally, when configured for obtaining meteorological information of the target flight region, the processor 200 is specifically configured for using a region where an aerial vehicle currently flies in or a region designated by the user as the target flight region; based on meteorological reference information of the aerial vehicle, accessing a network and searching the meteorological information of the target flight region indicated by the meteorological reference information. The meteorological reference information may include: designated meteorological reference information or meteorological reference information generated based on a type of the aerial vehicle.

Further, optionally, when configured for determining the flight-limiting parameter candidate of the aerial vehicle in the target flight region according to the obtained meteorological information, the processor 200 is specifically configured for looking up the flight parameter associated with the obtained meteorological information according to a preset mapping relationship between the meteorological information and the flight parameters, determining the looked up flight parameter as the flight-limiting parameter candidate of the aerial vehicle in the target flight region.

Further, optionally, when configured for determining the flight-limiting parameter candidate of the aerial vehicle in the target flight region according to the obtained meteorological information, the processor 200 is specifically configured for running a preset simulator according to the obtained various meteorological information as simulative meteorological input parameters to determine an impact of a simulative meteorological environment generated by the various meteorological information on a flight of a simulated aerial vehicle, and then determining the flight-limiting parameter candidate of the aerial vehicle in the target flight region.

Further, optionally, when configured for issuing a flight-limiting indication based on the determined flight-limiting parameter candidate, the processor 200 is specifically configured for displaying the determined flight-limiting parameter candidate; or generating a flight-limiting instruction for controlling a limited flight of the aerial vehicle according to the determined flight-limiting parameter, and issuing the flight-limiting instruction to control the limited flight of the aerial vehicle.

Further, optionally, when configured for issuing a flight-limiting indication based on the determined flight-limiting parameter candidate, the processor 200 is specifically configured for providing the flight-limiting parameter candidate to the user to select; generating a flight-limiting instruction for controlling a limited flight of the aerial vehicle according to a selection operation for the provided flight-limiting parameter candidate, and issuing the flight-limiting instruction to control the limited flight of the aerial vehicle.

It should be noted that, the specific implementation of the processor 200 of the aerial vehicle according to the embodiments of the present invention may refer to the description of the above-described method and device correspondingly.

Accordingly, the embodiments of the present invention may determine the flight-limiting parameter based on the obtained meteorological information of the target flight region, create the flight-limiting indication, and prompt the user in advance and control the flight task of the aerial vehicle, such that the unmanned aerial vehicle can perform the flight task in various regions more safely, ensuring flight safety of the aerial vehicle and meeting requirements of the user of the aerial vehicle on automatic and intelligent meteorological information.

In the embodiments provided by the present invention, it should be understood that, the disclosed related device and method may be implemented by other ways. For example, the above described device embodiments are merely schematic. The division of the modules or units is merely a logic function division, and other division manners may be employed when it is practiced actually. For example, more units or components may be combined or may be integrated into another system. Alternatively, some features may be omitted or not performed. Additionally, couplings or direct couplings or communication connections between one and another as displayed or discussed may be indirect couplings or communication connections via some interfaces, devices or units, or may be in electric, mechanical or other forms. Units described as separate parts may or may not be separated physically. Components displayed as units may or may not be physical units, i.e. may be located in one place, or may be distributed onto a plurality of network units. Some or all of the units may be selected in order to achieve the objectives of the solutions of the embodiments according to the actual requirements.

Additionally, various functional units in various embodiments according to the present invention may be integrated into one processing unit, or may be physically individual. Two or more of various function units may be integrated into one unit. The above integrated unit may be implemented in a form of hardware or in a form of functional units of software.

The integrated units, if being implemented in a form of functional units of software and being independent products, may be stored in one computer-readable storage medium. Based on such understandings, some or all of the technical solutions of the present invention may be embodied in a form of a software product. The software product may be stored in a storage medium, and comprise several instructions for causing the computer processor to execute some or all of steps of the methods in various embodiments according to the present invention. The above-mentioned storage medium may comprise: a USB flash disk, a movable hard disc, a Read-Only Memory (ROM), a Random Access Memory (RAM), a diskette or an optical disc and various medium capable of storing program codes.

The foregoing disclosure is merely illustrative of the embodiments of the invention, and is not intended to limit the patentable scope of the invention. Any equivalent structural or flow variations made on the basis of the description and the drawings of the invention, and their direct or indirect applications to other relevant technical fields, shall all fall into the patentable scope of the invention.

What is claimed is:

1. A flight instructing method, comprising:
   identifying a target flight region as a region where an aerial vehicle currently flies in or a region designated by a user;
   identifying meteorological reference information, the meteorological reference information indicating a type of meteorological information to be searched for a type of the aerial vehicle, the type of the aerial vehicle being determined according to a model number of the aerial vehicle;
   obtaining meteorological information of the target flight region by accessing a network and searching the meteorological information indicated by the identified meteorological reference information in the target flight region, the meteorological information including a haze level;
   determining a flight-limiting parameter candidate of the aerial vehicle in the target flight region according to the obtained meteorological information; and
   issuing a flight-limiting indication based on the determined flight-limiting parameter candidate, the flight-limiting indication including a maximum flight distance from a user according to the haze level.

2. The method of claim 1, wherein determining a flight-limiting parameter candidate of the aerial vehicle in the target flight region comprises:
   looking up a flight parameter associated with the obtained meteorological information according to a preset mapping relationship between the meteorological information and flight parameters; and
   determining the looked up flight parameter as the flight-limiting parameter candidate of the aerial vehicle in the target flight region.

3. The method of claim 2, wherein:
   a mapping relationship between the meteorological information with a level thereof and the flight parameters is included in the preset mapping relationship between the meteorological information and the flight parameters;
   looking up a flight parameter associated with the obtained meteorological information according to the preset mapping relationship between the meteorological information and the flight parameters comprises:
   analyzing and determining a meteorological level of the obtained meteorological information; and
   looking up an associated flight parameter in the preset mapping relationship between the meteorological information and the flight parameters based on the meteorological information and the level thereof.

4. The method of claim 1, wherein determining a flight-limiting parameter candidate of an aerial vehicle in the target flight region comprises:
   running a preset simulator according to the obtained meteorological information as simulative meteorological input parameters to determine an impact of a simulative meteorological environment generated by the meteorological information on a flight of a simulated aerial vehicle, and to further determine the flight-limiting parameter candidate of the aerial vehicle in the target flight region.

5. The method of claim 1, further comprising:
   judging whether a flight path in the target flight region is included in a flight task of the aerial vehicle; and
   if it is judged that the flight path in the target flight region is included in the flight task of the aerial vehicle, modifying and updating the determined flight-limiting parameter candidate according to the meteorological information to cause the aerial vehicle to fly normally.

6. The method of claim 1, wherein issuing a flight-limiting indication based on the determined flight-limiting parameter candidate comprises:
   displaying the determined flight-limiting parameter candidate to a user; or
   generating a flight-limiting instruction for controlling a limited flight of the aerial vehicle according to the determined flight-limiting parameter, and issuing the flight-limiting instruction to control the limited flight of the aerial vehicle.

7. The method of claim 1, wherein issuing a flight-limiting indication based on the determined flight-limiting parameter candidate comprises:
   providing the flight-limiting parameter candidate to a user to select;
   generating a flight-limiting instruction for controlling a limited flight of the aerial vehicle according to a selection operation for the provided flight-limiting parameter candidate; and
   issuing the flight-limiting instruction to control the limited flight of the aerial vehicle.

8. The method of claim 1, wherein the determined flight-limiting parameter candidate comprises any one or more of a flight speed parameter candidate, a flight altitude parameter candidate, and a flight distance range parameter candidate.

9. The method of claim 1, wherein the type of meteorological information to be searched includes one of a wind direction and a wind speed.

10. A flight instructing device, comprising:
    a memory storing computer-executable instructions; and
    a processor, when executing the computer-executable instructions stored in the memory, configured to:
    identify a target flight region as a region where an aerial vehicle currently flies in or a region designated by a user;
    identify meteorological reference information, the meteorological reference information indicating a type of meteorological information to be searched for a type of the aerial vehicle, the type of the aerial vehicle being determined according to a model number of the aerial vehicle; and
    obtain meteorological information of the target flight region by accessing a network and searching the meteorological information indicated by the identified meteorological reference information in the target flight region, the meteorological information including a haze level;
    determine a flight-limiting parameter candidate of an aerial vehicle in the target flight region according to the obtained meteorological information, the flight-limiting indication including a maximum flight distance from a user according to the haze level; and
    issue a flight-limiting indication based on the determined flight-limiting parameter candidate.

11. The device of claim 10, wherein the processor is further configured to run a preset simulator according to the obtained various meteorological information as simulative meteorological input parameters to determine an impact of a simulative meteorological environment generated by various meteorological information on a flight of a simulative aerial vehicle, and to further determine the flight-limiting parameter candidate of the aerial vehicle in the target flight region.

12. The device of claim 10, wherein the processor is further configured to perform one of:
   displaying the determined flight-limiting parameter candidate to a user; or
   generating a flight-limiting instruction for controlling a limited flight of the aerial vehicle according to the determined flight-limiting parameter, and issuing the flight-limiting instruction to control the limited flight of the aerial vehicle.

13. The device of claim 10, wherein the processor is further configured to:
   provide the flight-limiting parameter candidate to a user to select;
   generate a flight-limiting instruction for controlling a limited flight of the aerial vehicle according to a selection operation for the provided flight-limiting parameter candidate; and
   issue the flight-limiting instruction to control the limited flight of the aerial vehicle.

14. An aerial vehicle, comprising:
   a communication device;
   a memory storing computer-executable instructions; and
   a processor, when executing the computer-executable instructions stored in the memory, configured to:
   identify a target flight region as a region where an aerial vehicle currently flies in or a region designated by a user;
   identify meteorological reference information, the meteorological reference information indicating a type of meteorological information to be searched for a type of the aerial vehicle, the type of the aerial vehicle being determined according to a model number of the aerial vehicle;
   obtain meteorological information of the target flight region by accessing a network through the communication device and searching the meteorological information indicated by the meteorological reference information in the target flight region, the meteorological information including a haze level;
   determine a flight-limiting parameter candidate of the aerial vehicle in the target flight region according to the obtained meteorological information, the flight-limiting indication including a maximum flight distance from a user according to the haze level; and
   issue a flight-limiting indication based on the determined flight-limiting parameter candidate.

* * * * *